US010164856B2

(12) United States Patent
Browing et al.

(10) Patent No.: US 10,164,856 B2
(45) Date of Patent: Dec. 25, 2018

(54) RECONCILIATION OF ASYMMETRIC TOPOLOGY IN A CLUSTERED ENVIRONMENT

(71) Applicant: International Business Machines Corporation, Armonk, NY (US)

(72) Inventors: Luke M. Browing, Austin, TX (US); Perinkulam I. Ganesh, Round Rock, TX (US); Madhusudanan Kandasamy, TamiNadu (IN)

(73) Assignee: International Business Machines Corporation, Armonk, NY (US)

( * ) Notice: Subject to any disclaimer, the term of this patent is extended or adjusted under 35 U.S.C. 154(b) by 467 days.

(21) Appl. No.: 13/668,355

(22) Filed: Nov. 5, 2012

(65) Prior Publication Data
US 2014/0129696 A1    May 8, 2014

(51) Int. Cl.
*G06F 15/173* (2006.01)
*H04L 12/26* (2006.01)
*H04L 12/24* (2006.01)

(52) U.S. Cl.
CPC .............. *H04L 43/10* (2013.01); *H04L 41/12* (2013.01)

(58) Field of Classification Search
CPC ..... H04L 41/12; H04L 41/0853; H04L 45/02; H04L 45/00; H04L 45/28; H04L 45/48; H04L 43/0811; H04L 12/2697; H04L 12/2602; H04L 67/104
USPC .................. 370/254; 709/220, 223, 224, 238
See application file for complete search history.

(56) References Cited

U.S. PATENT DOCUMENTS

| 4,644,532 | A | | 2/1987 | George et al. |
| 5,659,881 | A | * | 8/1997 | Kent ............................ 455/520 |
| 6,363,495 | B1 | * | 3/2002 | MacKenzie et al. .......... 714/4.5 |
| 6,636,499 | B1 | * | 10/2003 | Dowling ....................... 370/338 |
| 6,646,984 | B1 | | 11/2003 | Mehra et al. |
| 6,757,836 | B1 | * | 6/2004 | Kumar et al. ................. 714/4.1 |
| 7,184,421 | B1 | | 2/2007 | Liu et al. |

(Continued)

OTHER PUBLICATIONS

Yonemoto, T. et al.; "Flexible multi-link ethernet binding system for PC clusters with asymmetric topology"; Proceedings of the 2009 IEEE 15th Internal Conference on Parallel & Distributed Systems (ICPADS 2009); pp. 49-56; 2009.
(Continued)

*Primary Examiner* — Ranodhi Serrao
(74) *Attorney, Agent, or Firm* — Thomas E. Tyson; Gregory K. Goshorn; Greg Goshorn, P.C.

(57) ABSTRACT

Provided are techniques for the orderly shutdown of a node within a cluster in the event of asymmetric topology maps, comprising receiving, at a first node, a plurality of heartbeats, each heartbeat corresponding to a particular, corresponding other node in the cluster and comprising information on a topological map corresponding to each particular other node's view of the cluster generating, by the first node, a topological map of the cluster based upon the information comprising the heartbeats; comparing the topological map of the cluster and the topological maps corresponding to each node; in response to a determination that the topological maps of the duster and each node are not in agreement, determining the connectivity of the first node with respect to the cluster and in respond to a determination that the first node has the lowest connectivity within the cluster, shutting down the first node.

20 Claims, 7 Drawing Sheets

(56) References Cited

U.S. PATENT DOCUMENTS

| | | | |
|---|---|---|---|
| 7,287,180 B1* | 10/2007 | Chen et al. | 714/4.3 |
| 2005/0027780 A1* | 2/2005 | Pai | G06K 9/6224 709/200 |
| 2005/0268151 A1* | 12/2005 | Hunt | H04L 41/0663 714/4.1 |
| 2011/0179231 A1* | 7/2011 | Roush | 711/152 |
| 2012/0002571 A1* | 1/2012 | Lovy et al. | 370/254 |
| 2012/0159021 A1 | 6/2012 | Padmanaban et al. | |

OTHER PUBLICATIONS

Kan, Z. et al.; "Towards a cluster based incentive mechanism for P2P networks"; 2009 9th IEEE/ACM International Symposium on Cluster Computing & the Grid (CCGrid 2009), pp. 532-537; IEEE; 2009.

Anonymous; "A method to setup network deployment environment automatically with graphical view"; http://priorartdatabase.com/IPCOM/000219963; Jul. 18, 2012.

Centero, M. et al.; "Oracle9i Real Application Clusters and PolyServe Matrix Server on IBM eserver xSeries and BladeCenter"; IBM Corporation; ibm.com/redbooks/redp9123; Nov. 2004.

Wikipedia, "Computer Cluster," http://en.wikipedia.org/wiki/Computer_cluster#Node_failure_management; downloaded Nov. 5, 2012.

"Fencing," Red Hat, Inc., http://docs.redhat.com/docs/en-US/Red_Hat_Enterprise_Linux/5/html/Cluster_Suite_Overview/s2-fencing-overview-CSO.html; downloaded Nov. 5, 2012.

* cited by examiner

RECONCILIATION OF ASYMMETRIC TOPOLOGY IN A CLUSTERED ENVIRONMENT

FIELD OF DISCLOSURE

The claimed subject matter relates generally to computer clusters and, more specifically, to techniques for maintaining a consistent topological view among the nodes of a cluster.

SUMMARY

Provided are techniques for maintaining a consistent topological view among nodes of a computing cluster. Those with skill in the computing arts have developed many techniques for increasing, productivity and reliability. One such technique is the grouping of computing systems into clusters. Computing systems organized into clusters may both divide processing tasks to increase throughput and provide redundancy to decrease downtime.

Nodes within a cluster often use "heartbeats" to detect problems. A heartbeat is a signal from a first node to a second node that enables the second node to determine whether the first node and the communication medium between the two nodes are functioning. A "gossip" heartbeat includes additional information in conjunction with a simple signal indicating that nodes and connections are functioning. To increase redundancy, nodes within a cluster may transmit heartbeats over multiple interfaces, such as, but not limited to, an Ethernet, a storage area network (SAN), a data information service center (DISK) and a direct connection.

Provided are techniques for the orderly shutdown of a node within a cluster of nodes in the event of asymmetric topology maps, comprising receiving, at a first node of a plurality of nodes in a cluster, a plurality of heartbeats, each heartbeat corresponding to a particular, corresponding other node in the cluster and comprising information on a topological map corresponding to each particular other node's view of the cluster; generating, by the first node, a topological map of the cluster based upon the information comprising the heartbeats; comparing the topological map of the cluster and the topological maps corresponding to each node; in response to a determination that the topological maps of the cluster and each node are not in agreement, determining the connectivity of the first node with respect to the cluster; and in respond to a determination that the first node has the lowest connectivity within the cluster, shutting down the first node.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following, detailed description of the disclosed embodiments is considered in conjunction with the following figures.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally he referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can he implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As explained above, Nodes within a cluster often use "heartbeats" to detect problems and, to provide redundancy, nodes within a cluster may transmit heartbeats over multiple interfaces, such as, but not limited to, an Ethernet, a storage area network (SAN), a data information service center (DISK) and a direct connection. As the Inventors herein have realized, although transmitting heartbeats over multiple interfaces may improve reliability, a partial loss of connectivity between one or more node to other nodes may cause an asymmetric topological views among the nodes, i.e. different nodes may have different views of which other nodes are connected and functioning.

For example, if there are two sites, i.e. a site_1 and as site_2. and two nodes at each site, i.e. a node_A and a node_B at site_1 and as node_C and a node_D at site_2. assume that node_A and Node_B transmit heartbeats to each other Ethernet and DISK and that node_C and node_D also transmits heartbeats to each other over Ethernet and DISK. Also assume that node_A and node_B only transmit heartbeats to node_C and node_D over Ethernet. If node_A loses connectivity to over the Ethernet to nodes C and D. node_A would still remain connectivity to node_B. Eventually, after all node timeouts have lapsed, node_A would only think that node_B is functioning; nodes C and D would think that only nodes B, C and D are functioning; and node B would think that all nodes A, B, C and D are functioning. Asymetric topologies may lead to cluster inoperability issues. For example cluster-wide locks may he erroneously granted leading to repository corruption and confusion among upper network layers.

Figure 1:
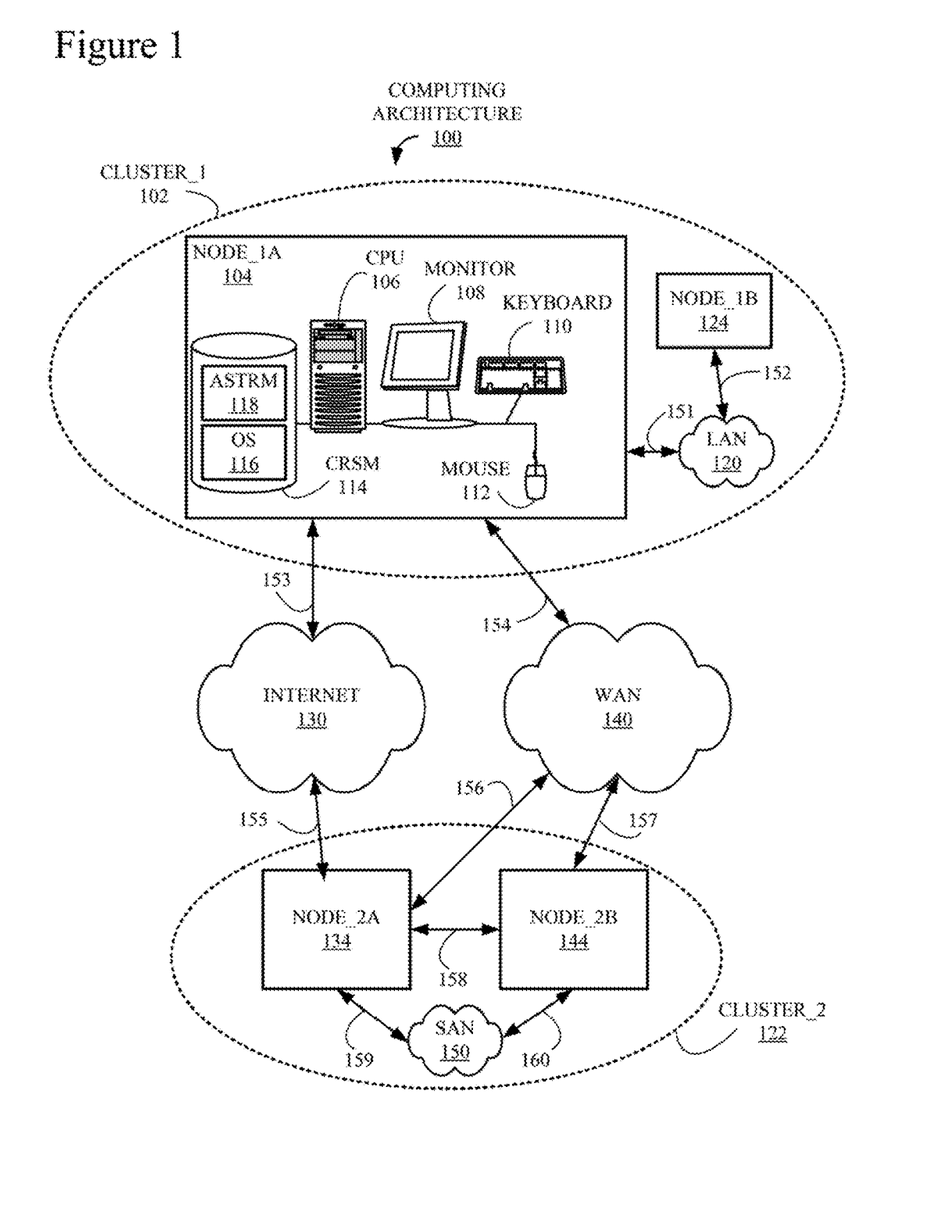
FIG. 1 is a block diagram of a computing architecture that may implement the claimed subject matter.

Turning now to the figures, FIG. 1 is a block diagram of one example of a computing architecture 100 that may incorporate the claimed subject matter. In this example, architecture 100 has two (2) computing, clusters, or simply "clusters," i.e., a cluster_1 102 and a cluster_2 122. Each of clusters 102 and 122 have two (2) computing nodes, or simply "nodes." Cluster_1 102 has a node_1A 104 and a node_1B 124. Cluster_2 122 has a node_2A 134 and a node_2B 144.

Node_1A 104 includes a central processing unit (CPU) 106, coupled to a monitor 108, a keyboard 110 and a pointing device, or "mouse," 112, which together facilitate human interaction with the elements of node_1A 104, cluster_1 102 and architecture 100. Also included in node_1A 104 and attached to CPU 106 is a computer-readable storage medium (CRSM) 114, which may either be incorporated into node_1A 104 i.e. an internal device, or attached externally by means of various, commonly available connection devices such as but not limited to, a universal serial bus (USB) port (not shown). CRSM 114 is illustrated storing an operating system (OS) 116 and an Asymmetric Topology Reconciliation Module (ASTRM) 118, which incorporates functionality associated with the claimed subject matter. ASTRM 118 is described in more detail below in conjunction with FIGS. 2-7. Typically, nodes 124, 134 and 144 would also include components such as 106, 108, 110, 112, 114, 116 and 118, which for the sake of simplicity are not illustrated.

Nodes 104, 124, 134 and 144 are communicatively coupled via a number of communication paths 151-160. Path 151 connects node_1A 104 to a local area network (LAN) 120, which in this example is an Ethernet. Path 152 connects node_1B 124 to LAN 120. Path 153 connects node_1A 104 to the Internet 130. Path 154 connects node_1A 104 to a wide area network (WAN) 140. Path 155 connects node_2A 134 to the Internet 130. Path 156 connects node_2A 134 to WAN 140. Path 157 connects node_2B to WAN 140. Path 158 connects node_1A 134 directly to node_2B 144. Paths 159 and 160 connect node_2A 134 and node_2B 144 to a storage area network (SAN) 150, respectively. Paths 151-160 are used merely as examples of the manner in which nodes such as nodes 104, 124, 134 and 144 may be connected in multiple and possibly redundant ways. In addition, paths 151-160 may, but are not limited to, be wired, wireless, Ethernet, TCP/IP, TCP, and any other currently available or yet to be developed communication mediums and protocols. As explained in more detail below in conjunction with FIGS. 2-7, communication paths 151-160 are employed to transmit "heartbeats" between nodes 104, 124. 134 and 144. Further, it should be noted there are many possible computing architectures configurations, of which computing architecture 100 is only one simple example used for the purposes of explanation of the claimed subject matter.

Figure 2:
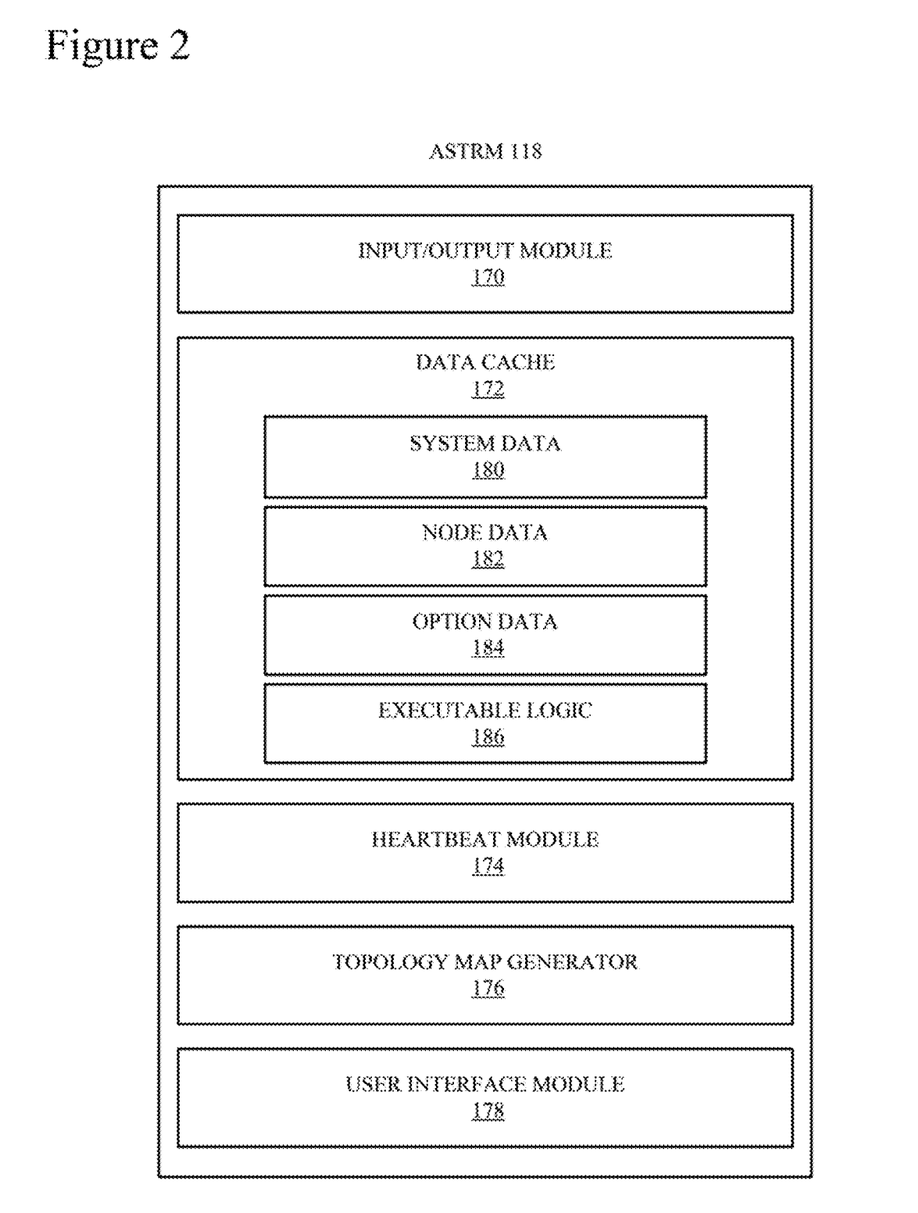
FIG. 2 is a block diagram of an Asymmetric Topology Reconciliation Module ASTRM), first introduced in FIG. 1, that may implement the claimed subject matter.

FIG. 2 is a block diagram of ASTRM 118, first introduced in FIG. 1, in more detail. ASTRM 118 includes an input/ output (I/O) module 179, a data cache component 172, a heartbeat module 174, a topology generator 176 and a user interface (UI) module 178. For the sake of the following examples, ASTRM 118 logic associated with ASTRM 118 is stored on CRSM 114 (FIG. 1) and executes on one or more processors (not shown) of CPU 106 of node_A 104. It should be understood that the claimed subject matter can be implemented in many types of computing systems and data storage structures but, for the sake of simplicity, is described only in terms of node_A 104 and system architecture 100 (FIG. 1). Further, the representation of ASTRM 118 in FIG. 2 is a logical model. In other words, components 170, 172, 174, 176 and 178 may be stored in the same or separates files and loaded and/or executed within system 100 either as a single system or as separate processes interacting via any available inter process communication (IPC) techniques.

I/O module 179 handles any communication ASTRM 118 has with other components of node_1A 104 and architecture 100, including corresponding ASTRMs (not shown) executing on node_B 124 (FIG. 1), node_2A 134 (FIG. 1) and node_2B 144 (FIG. 1). Data cache 172 is a data repository for information, including system and node data, that ASTRM 118 employs during normal operation. Examples of the types of information stored in data cache 172 include system data 180, node data 182, option data 184 and executable logic 186.

System data 180 stores data on various communication components of computing architecture 100 such as but not limited to communication paths 151-160. System data 189 also stores a topology map of architecture 190 based upon responses received by a heartbeat monitor 174 and generated by a topology map generator 176. Option data 184 stores various parameters that control the operation of ASTRM 118, including but not limited to connect timeout values and numbers of attempts made prior to a determination that a particular node is unavailable. Executable logic 186 stores the computer code that executes in conjunction with ASTRM 118.

Heartbeat monitor 174 both generates and receives signals, or "heartbeats," to and from other nodes such as nodes 124. 134 and 134. Topology generator parses "gossip" heartbeats from other nodes and generates a topology map that indicates the current status of nodes and connections within architecture 100. UI component 178 enables administrators of ASTRM 118 to interact with and to define the desired functionality of ASTRM 118, primarily by setting operation parameters stored in option data 184. Components 172, 174, 176, 178, 180, 182, 184 and 186 are described in more detail below in conjunction with FIGS. 3-7.

Figure 3:
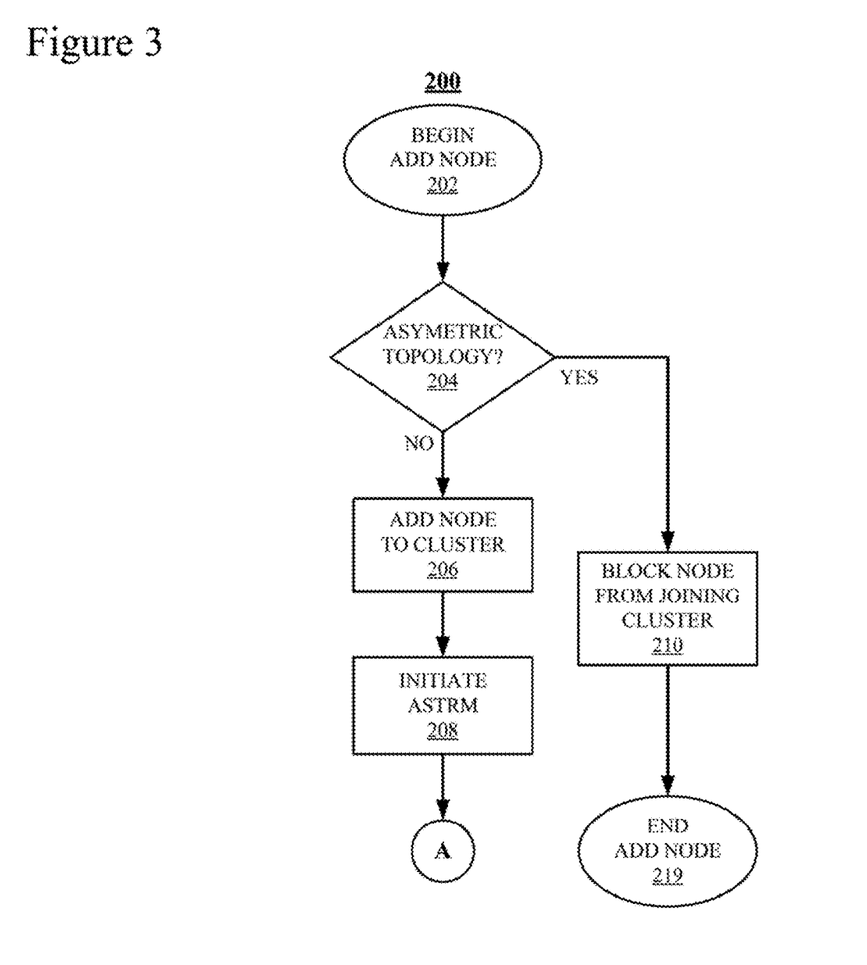
FIG. 3 is a flowchart of an "Add Node" process that may implement aspects of the claimed subject matter.

FIG. 3 is a flowchart of an "Add Node" process 200 that may implement aspects of the claimed subject matter. In this example, logic associated with process 200 is stored in conjunction with ASTRM 118 (FIG. 1) on CRSM 114 (FIG. 1) and executed on one or more processors (not shown) of CPU 106 (FIG. 1) on node_1A 104 (FIG. 1). Process 200 may he executed when node_1A 104 is first powered up or later upon initiation be an administrator.

Process 200 starts at a "Begin Add Node" block 202 and proceeds immediately to an "Asymmetric Topology?" block 204. During processing associated with block 204, a determination is made as to whether or not nodes, such as node_1B 124, node_2A 134 and node_2B 144 share a similar view or the current topological configuration. This determination may he made based upon signaling between node_1A 104 and nodes 124, 134 and 144 in which each particular node 124, 134 and 144 transmits a message indicating the number and identity of other nodes known to the particular node. If all nodes agree on the specific number and identity, control proceeds to an "Add Node to Cluster" block 206. During processing associated with block 206, standard procedures are followed to add node_1A 104 to the cluster. It should be noted that although in this example the "cluster" consists of the combination of cluster_1 102 and cluster_2 122, the claimed subject matter is equally applicable to a single cluster.

During processing associated with an "Initiate ASTRM" block 208, background, operational procedures associated with ASTRM 118 (see 250, FIG. 4) are initiated. Control then proceeds to a Transition Point A, which continues below in FIG. 4. It during processing associated with block 204, a determination is made that the nodes 124, 134 and 144 do not share a similar topological view of the current cluster, control proceeds to a "Block Node From Joining Cluster" block 210. During processing associated with block 210, the node is riot joined to the cluster appropriate actions such as, but not limited to, notifying an administrator and logging the attempt are performed. Control then proceeds to an "End Add Node" block 219 in which process 200 is complete.

Figure 4:
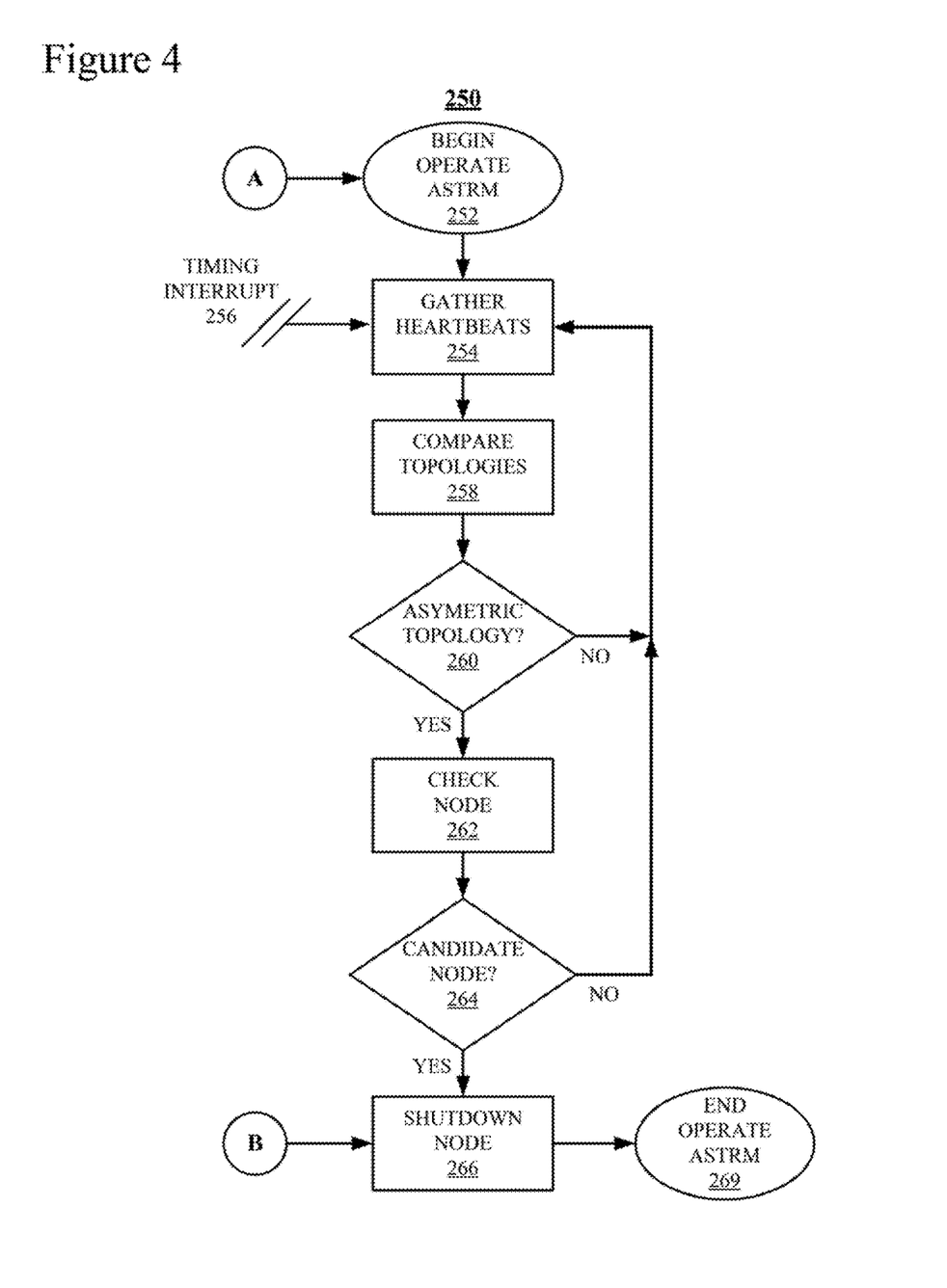
FIG. 4 is a flowchart of an "Operate ASTRM" process that may implement aspects of the claimed subject matter.

FIG. 4 is a flowchart of an "Operate ASTRM" process 250 that may implement aspects of the claimed subject matter. Like process 200 (FIG. 3), in this example, logic associated with process 250 is stored in conjunction with ASTRM 118 (FIGS. 1 and 2) on CRSM 114 (FIG. 1) and executed on one or more processors (not shown) of CPU 106 (FIG. 1) on node_1A 104 (FIG. 1). Process 200 may be executed when node_1A 104 is first powered up or later upon initiation be an administrator.

Process 250 starts at a "Begin Operate ASTRM" block 252 and proceeds immediately to a "Gather Heartbeats" block 254. Block 252 is may he entered via transition point A (FIG. 3) from process 200 (FIG. 3). During processing associated with block 254, heartbeats transmitted by other nodes, such as node 124, 134 and 144 (FIG. 1) are received by the current node, which in this example is node_1A 104. Such heartbeats may be received, depending upon the node, via connections 151-160 (FIG. 1).

In accordance with one embodiment of the disclosed technology, the heartbeats are "gossip" heartbeats. i.e. each heartbeat includes information that indicates that the node transmitting the heartbeat is active and also includes information that the transmitting heartbeat has received from other nodes indicating both which other nodes are available and the topology sensed by each of the other nodes, i.e., which other nodes each other node think are available.

For example, in a healthy state, gossip packets from node_1A 104 to each of nodes 124, 134 and 144 would include the following connectivity information:

<node_1A 104, 3>,<node_1B 124, 3>,<node_2A 134, 3>,<node_2B 144, 3>, indicating that each node is visible to the other nodes, i.e. each node "sees three (3) other nodes. Gossip heartbeats from nodes 124, 134 and 144 would contain the same information. If node_2B 144 loses connectivity to node_1A 104, then the gossip packet sent by node_2B 144 to each other node 104, 134 and 144 would include the following connectivity information:

<node_1A 104, 3>,<node_1B 124, 3>,<node_2A 134, 3>,<node_2B 144, 2>, which indicates that node_2B 144 only sees two (2) other nodes. The information corresponding to node_1A 104 would still Indicate that node_1A. 104 sees three other nodes because node_2B 144 is forwarding information received form node_1A 104 in a previous heartbeat. In a similar fashion, a current packet from node_1A 104 would include the following information:

<node_1A 104, 2>,<node_1B 124, 3>,<node_2A 134, 3>, <node_2B 144, 3>.

It should be noted that node_1A 104 and node_2B do not exchange information directly because, in this example, connectivity between nodes 104 and 144 has been lost. However, nodes 104 and 144 would receive the information indirectly via nodes 124 and 134.

For example, node_1A 104 may receive a heartbeat from node_2B 134 that, in addition to indicating that node_2A 134 is active, indicates that node_2B 144 is active, in the event, that WAN 140 is not available, node_1A 104 may not receive a heartbeat directly from node_2B 144, in this manner, node_1A 144 may imply that node_2B 144 is active even in the absence of a heartbeat directly from node_2B 144. After a few exchanges of heartbeats, all node 104, 124, 134 and 144 would have the following information:

<node_1A 104, 2>,<node_1B 124, 3>.<node_2A 134, 3>, <node_2B 144, 2>.

This situation would be considered an "asymmetry" and would be handled as describe below in conjunction with FIGS. 4-6.

Process 250 collects heartbeats over a period of time and upon receiving a timing interrupt 256, control proceeds to a "Compare Topologies" block 258. The specific period of time allocated for the collection of heartbeats may be set with a parameter associated with ASRM 118 (see 154, FIG. 2). In addition, the collection of heartbeats may continue during processing associated with the remainder of process 250. During processing associated with block 258, the topologies received from other nodes 124, 134 and 144 are compared with the topology generated by node_1A 104 (176, FIG. 2). It should be noted that nodes with a connectivity score equal zero (0) are not considered because the zero (0) indicated that the node has already shutdown. During processing associated with an "Asymmetric Topology" block 260, a determination is made as to whether or not the topologies compared during processing associated with block 258.

If so, processing returns to block 254 and processing continues as describe above. If not, control proceeds to a "Cheek Node" block 262. During processing associated with block 262, the current node, which in this example is node_1A 104, is checked (see 300, FIG. 5) to determine whether or not it is a node that should be shutdown, or "panicked." During processing associated with a "Candidate Node?" block 264, a determination is made as to whether or not the current node_1A 104 is the appropriate node, or "candidate," to be shutdown. If not, control returns to block 254 and processing continues as described above. If so, control proceeds to a "Shutdown Node" block 266. During processing associated with block 266 node_1A 104 would be shutdown in conjunction with the transmission of any messages to other nodes 124, 134 and 144 that ma need to be sent indicating that a shutdown has occurred. Block 266 may also be reached via a Transition Point B, which is explained below in conjunction with FIG. 6. Finally, during processing associated with an "End Operate ASTRM" block 269, process 250 is complete.

Figure 5:
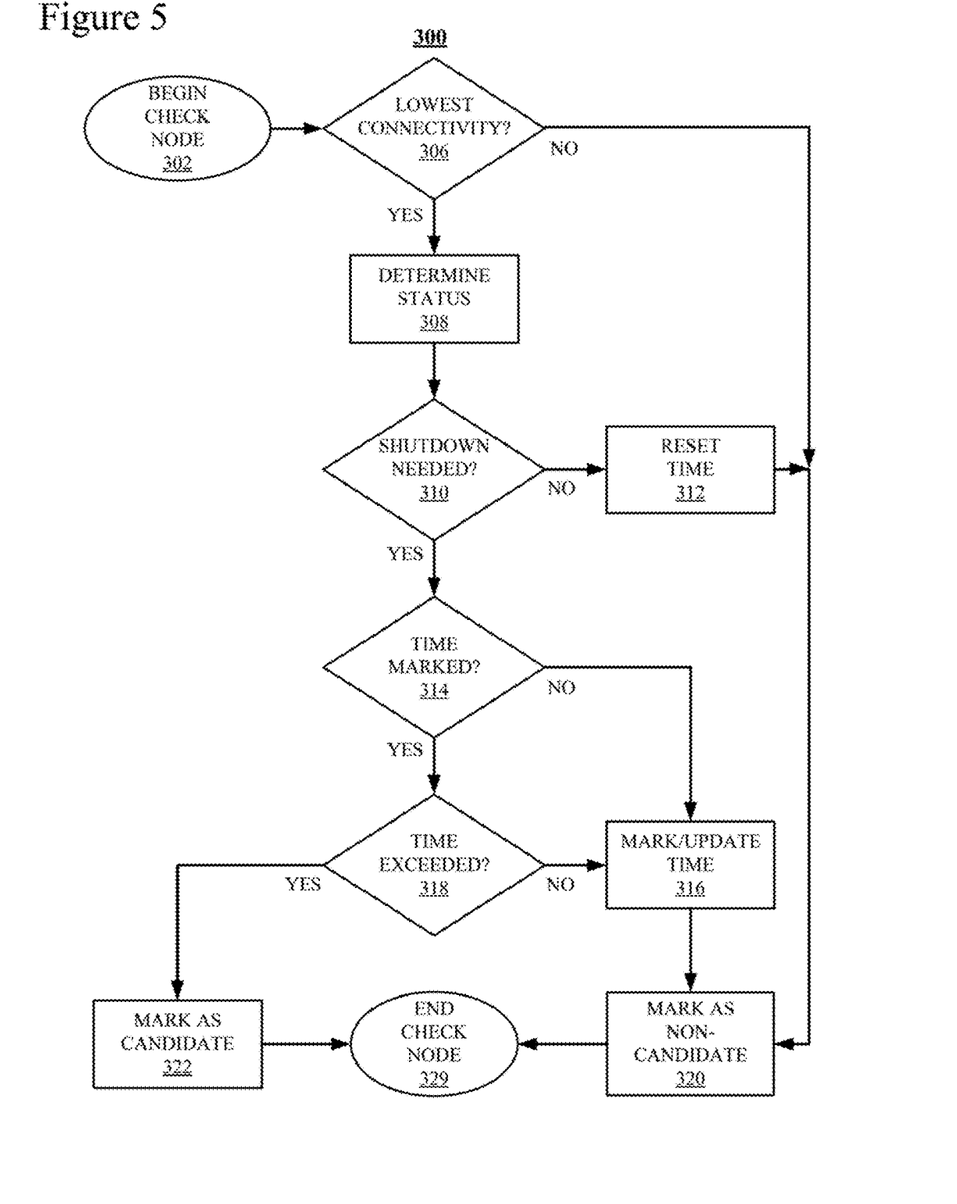
FIG. 5 is a flowchart of a "Check Node" process, first introduced in FIG. 4, that may implement aspects of the claimed subject matter.

FIG. 5 is a flowchart of a "Check Node" process 300, first introduced in conjunction with FIG. 4, that may implement aspects of the claimed subject matter. In this example, logic associated with process 300 is stored in conjunction with ASTRM 118 (FIGS. 1 and 2) on CRSM 114 (FIG. 1) and executed on one or more processors (not shown) of CPU 106 (FIG. 1) on node 104 (FIG. 1).

Process 300 starts at a "Begin Check Node" block 302 and proceeds immediately to a "Lowest Connectivity?" block 304. During processing associated with block 304, the current node, which in this example is node_1A 104, determines whether or not, with respect to detected asymmetric topology (see 260, FIG. 4), the current node has the lowest connectivity. For example, in a symmetrical topology of N nodes, each node would typically see N-1 other nodes. If a connection is unavailable between to particular nodes, then one or both of the particular nodes may see only N-2 other nodes while the remaining nodes see N-1 nodes. In other words, an asymmetric topology is detected and one or both of the particular nodes have the lowest connectivity. In the event that two nodes share the lowest connectivity, a tie breaker is employed (see 350, FIG. 6). It should also be noted that in a determination of lowest connectivity, nodes with a connectivity of zero (0) are not considered. In other words, nodes that are down or are isolated are considered to have zero (0) connectivity and arc therefore not considered.

If a determination is made that the current node has the lowest connectivity based upon available connections and, if necessary, a tie breaker, control proceeds to a "Determine Status" block 308. During processing associated with block 308, the current node determines the status of other nodes, specifically whether or not any other node has been designated as a shutdown candidate. During processing associated with a "Shutdown Needed?" block 310, a determination is made as to whether or not the current node should be considered a shutdown candidate. For example, if there is another node already in the process of shutting down, there is no need for the current node to do so. In other words, in this example, only one node is selected as the candidate for shutdown. If a determination is made that a shutdown is not necessary, control proceeds to a "Reset Time" block 312. During processing associated with block 312, a time parameter is reset and control proceeds to a "Mark as Non-Candidate" block 320. The use of the time parameter and processing associated with block 320 are explained in more detail below.

If during processing associated with block 310, a determination is made that a shutdown is necessary, control proceeds to a "Time Marked?" block 314. During processing associated with block 314, the time parameter first mentioned in conjunction with block 312 is checked to see if it has been set. In this manner, a node may not be shutdown at the first indication of an asymmetric topology as some such asymmetric topologies may sort themselves out. If the time parameter is not marked, control proceeds to a "Mark/Update Time" block 316. During processing associated with block 316, the time parameter is set to an initial value as specified by a system administrator (see 184, FIG. 2).

If, during processing associated with block 314, a determination is made that the time parameter has already been set, control proceeds to a "Time Exceeded?" block 318. During processing associated with block 318, a determination is made as to whether or not the time parameter has exceeded a pre-defined value. The pre-defined value, typically set by an administrator (see 184, FIG. 2), is based upon a specific number of times that a determination has been made that a shutdown is needed. In other words, an administrator may determine a number of heartbeat cycles that may execute prior to a shutdown. If the time parameter does not exceed the pre-defined value, control proceeds to Mark/

Update Time block 316 and the time parameter is updated to reflect the additional cycle. By introducing a delay prior to a decision to shut down any particular node, "jitters" are avoided. In this manner ASTRM 118 may insure that it has the correct shutdown candidate by sensing a consistent pattern, in addition, if an issue causing an asymmetric topology is resolved, e.g. a connection is restored, symmetry may be restored and a shutdown of any node avoided. During processing associated with a "Mark as Non-Candidate" block 320, the current node is marked to indicate that at the current time, the current node is not a candidate for a shutdown.

If during processing associated with block 318, the time parameter does exceed the pre-defined value, control proceeds to a "Mark as Candidate" block 322. During processing associated with block 322, the current node is marked as a candidate to shutdown (see 264 and 266. FIG. 4). Finally, once the current mode has been marked as a candidate during processing associated with block 322 or marked as a non-candidate during processing associated with block 320, control proceeds to an "End Check Node" block 329 in which process 300 is compete.

Figure 6:
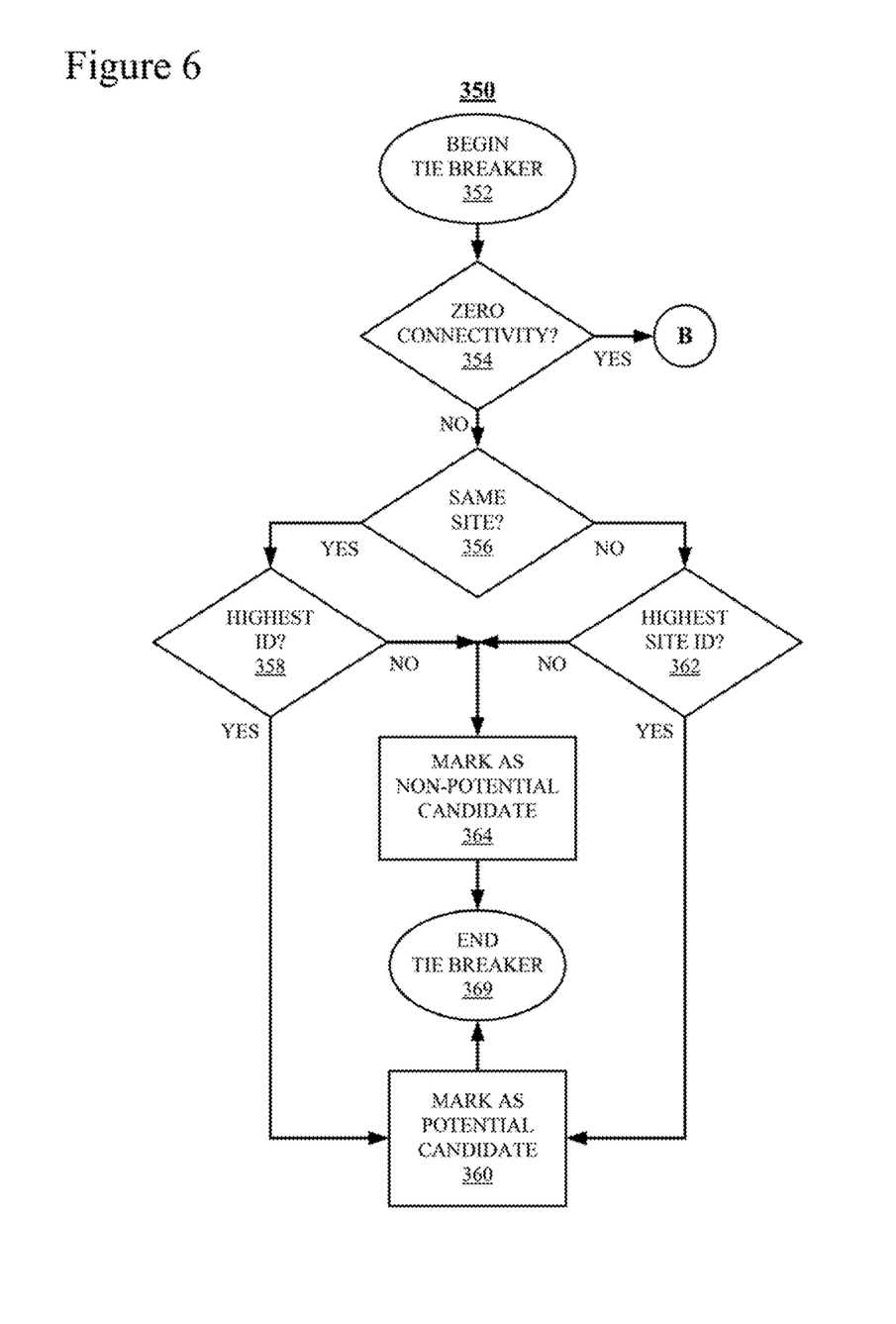
FIG. 6 is a "Tie Breaker" process that may be used in conjunction with the Check Node process of FIG. 5.

FIG. 6 is a "Tie Breaker" process 350 that may be used in conjunction with block 306 of the Check Node process of FIG. 5. As explained above in conjunction with FIG. 5, in some situations a node may share the lowest connection number with one or more other nodes. In this example in which only one other node shares a connectivity number, the current node is node_1A 104 (FIG. 1) and the other node, the node with the same low connectivity number, is node_2A 134 (FIG. 1). In this example, logic associated with process 350 is stored in conjunction with ASTRM 118 (FIGS. 1 and 2) on CRSM 114 (FIG. 1) and executed on one or more processors (not shown) of CPU 106 (FIG. 1) on node_1A 104 (FIG. 1).

Process 350 starts at a "Begin Tie Breaker" block 352 and proceeds immediately to a "Zero Connectivity?" block 354. During processing associated with block 354, a determination is made as to whether or not the current node has zero connectivity, i.e. cannot see any other node. If so, control proceeds to a Transition Point B that transfers control to Shutdown Node block 166 (FIG. 4). In any words, any node with zero connectivity is shutdown regardless of whether or not the connectivity value is shared with another node.

If during processing associated with block 354, a determination is made that the current node has connectivity to at least one other node, control proceeds to a "Same Site?" block 356. During processing associated with block 356, a determination is made as to whether or not the current node is on the same site as the other node. For example, node_1A 104 and node_1B 124 (FIG. 1) are both on the same site. i.e. cluster_1 102 (FIG. 1), and node_1A 104 and node_2A 134 are on different sites, i.e. cluster_1 102 and cluster_2 122 (FIG. 1), respectively. If the nodes 104 and 134 are on the same site, which in this example they are not, control proceeds to a "Highest ID?" block 358. During processing associated with block 358, a determination is made as to whether or not the current node has a higher ID than the other node. If so, control proceeds to a "Mark as Potential Candidate" block 360. During processing associated with block 360, the current node is marked as a potential candidate for shutdown. The node is merely a "potential" candidate because addition factors must also be taken into account prior to a decision to shut down the node (see 310, 314 and 318, FIG. 5).

If, during processing associated with block 356, a determination is made the nodes are not on the same site, control proceeds to a "Highest Site ID?" block 362. During processing associated with block 362, a determination is made as to which of the nodes that share a connectivity number is associated with the site with the highest ID number. If the current node has the highest site ID, control proceeds to block 360 and processing continues as describe above. If, during processing associated with block 358, a determination is made that the current node does not have the highest or during processing associated with block 362, a determination is made that the current node does not have the highest site ID, control proceeds to a "Mark as Non-Candidate" block 364. During processing associated with block 364, the current node is marked as not the potential candidate on this iteration. Finally, control proceeds to an "End Tie Breaker" block 369 in which process 350 is complete.

Figure 7:
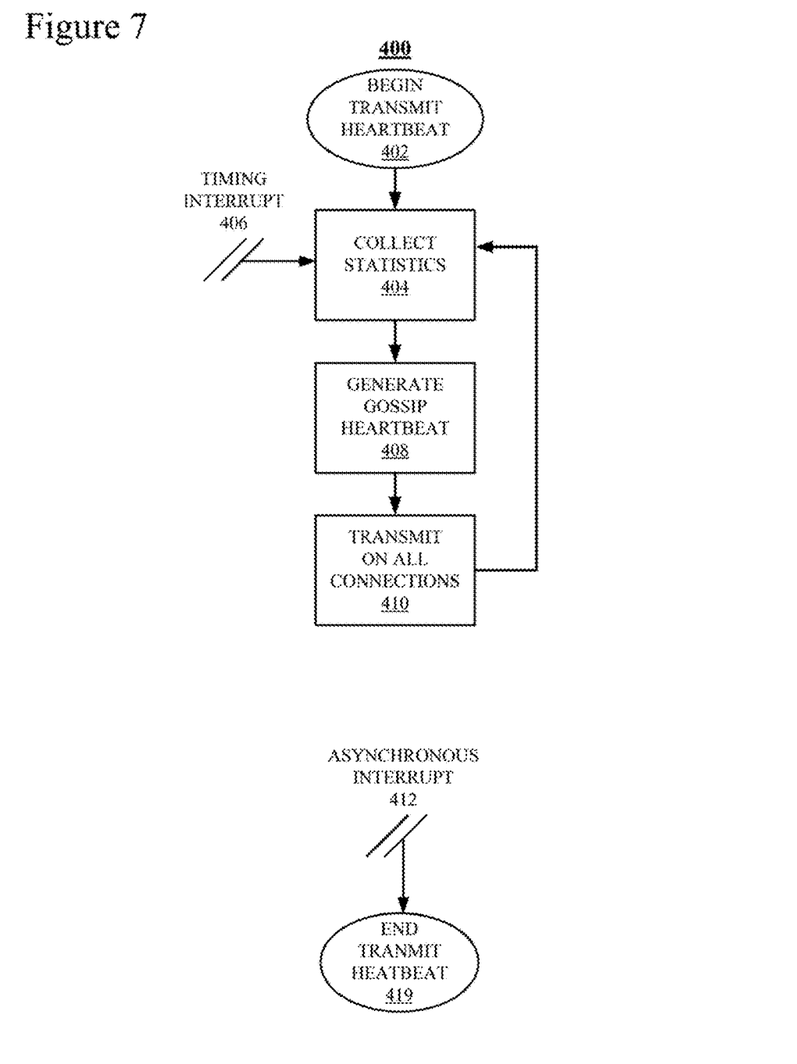
FIG. 7 is a "Transmit Heartbeat" process that may implement aspects of the claimed subject matter.

FIG. 7 is a "Transmit Heartbeat" process 400 that may implement aspects of the claimed subject matter. In this example, logic associated with process 400 is stored in conjunction with ASTRM 118 (FIGS. 1 and 2) on CRSM 114 (FIG. 1) and executed on one or more processors (not shown) of CPU 106 (FIG. 1) on node_1A 104 (FIG. 1).

Process 400 starts at a "Begin Transmit Heartbeat" block 402 and proceeds immediately to a "Collect Statistics" block 404. During processing associated with block 404, ASTRM 118 receives heartbeats from other nodes within the cluster. In this example, the current node is node_1A 104, which potentially received heartbeats from nodes 124 134 and 144 (FIG. 1). This collection continues until a timing interrupt 406 is received. The duration between timing interrupts is set be an administrator and stored as an option (see 184, FIG. 2). Once interrupt 406 is received, control proceeds to a "Generate Gossip Heartbeat" block 408. During processing associated with block 408, the information collected during processing associated with block 404 is tabulated and a gossip heartbeat is produced. The heartbeat includes information about the connectivity of the current node and any information received from other nodes about their connectivity. If a node does not receive a heartbeat from some particular node within the time between two interrupts 406, than that particular node is marked as a connectivity equal to zero (0). A node may overwrite another node's reported connectivity when the connectivity number is directly provided by the node or reported indirectly when a different node is declared as down.

During processing associated with a "Transmit on All Connections" block 410, the heartbeat generated during processing associated with block 408 is transmitted to all other nodes that have a functioning connection with the current node. Control then returns to block 404 and processing continues as described above. It should be understood that block 404 may also continue to receive heartbeats from other nodes during processing associated with blocks 408 and 410.

Finally, process 400 is halted by means of an asynchronous interrupt 412, which passes control to an "End Transmit Heartbeats" block 419 in which process 400 is complete. Interrupt 412 is typically generated when ASTM 118, OS 116 (FIG. 1) or node_1A 104 is halted. During normal operation, process 400 continuously loops through the blocks 404, 408 and 410, processing and transmitting heartbeats as ASTRM 118 receives and generates them.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method, comprising:
   receiving, at a first node of a plurality of nodes in a cluster, a plurality of heartbeats, each heartbeat corresponding to a corresponding other node of the plurality of nodes in the cluster and comprising:
      information on the corresponding other node;
      which other nodes are available to the corresponding other node; and
      which other nodes of the plurality of nodes each corresponding node are directly connected to the corresponding node in the same cluster;
   generating, by the first node, a topological map of the cluster based upon the information comprising the heartbeats;
   comparing, by the first node, the topological map of the cluster and topological maps generated by each node;
   in response to a determination that the topological maps of the cluster and each node are not in agreement, determining the connectivity of the first node with respect to the cluster; and
   in response to a determination that the first node has the lowest connectivity within the cluster, shutting down the first node, wherein the connectivity is ordered from lowest to highest with lowest representing nodes with the fewest number of direct connections to Other nodes in the cluster.

2. The method of claim 1, further comprising:
   detecting that connectivity of the first node and a connectivity corresponding to a second node of the plurality of nodes are equal and the lowest connectivity within the cluster; and
   implementing a tie breaker procedure to designate which of the first node and the second node is shutdown.

3. The method of claim 2, the tiebreaker procedure comprising:
   comparing a node ID of the first node to a node ID of the second node if the first and second nodes are on a common site; and
   comparing a site ID of the first node to a site ID of the second node if the first and second nodes are not on a common site.

4. The method of claim 1, further comprising:
   setting a timeout parameter in response to a determination that the first node has the lowest connectivity within the cluster;
   delaying the shutting down of the first node until the lowest connectivity has persisted through a successive heartbeat; and
   incrementing the timeout parameter in response to the delaying; and
   implementing the shutting down of the first node only in response to a determination that the timeout parameter has exceeded a predefined limit.

5. The method of claim 4, further comprising resetting the timeout parameter in response to a determination after the successive heartbeat that the first node no longer has the lowest connectivity within the cluster.

6. The method of claim 1, further comprising, ignoring a topology map of a node with a connectivity of zero.

7. The method of claim 1, wherein the cluster is a composite of two or more other clusters.

8. An apparatus, comprising:
   a processor;
   a computer-readable storage medium coupled to the processor; and
   logic, stored on the computer-readable storage medium and executed on the processor, for:
      receiving, at a first node of a plurality of nodes in a cluster, a plurality of heartbeats, each heartbeat corresponding to a corresponding other node in the cluster and comprising;
         information on the corresponding other node;
         which other nodes are available to the corresponding other node; and
         which other nodes of the plurality of nodes each corresponding node are directly connected to the corresponding node in the same cluster;
      generating, by the first node, a topological map of the cluster based upon the information comprising the heartbeats; wherein the topology map includes the current status of nodes and connections between nodes;
      comparing, by the first node, the topological map of the cluster and topological maps generated by each node;
      in response to a determination that the topological maps of the cluster and each node are not in agreement, determining the connectivity of the first node with respect to the cluster; and in response to a determination that the first node has the lowest connectivity within the cluster, shutting down the first node, wherein the lowest connectivity is based upon which other nodes of the plurality of nodes each corresponding node are directly connected to the corresponding node.

9. The apparatus of claim 8, the logic further comprising logic for:
detecting that connectivity of the first node and a connectivity corresponding to a second node of the plurality of nodes are equal and the lowest connectivity within the cluster; and
implementing a tie breaker procedure to designate which of the first node and the second node is shutdown.

10. The apparatus of claim 9, the tie breaker procedure comprising logic for:
comparing a node ID of the first node to a node ID of the second node if the first and second nodes are on a common site; and
comparing a site ID of the first node to a site ID of the second node if the first and second nodes are not on a common site.

11. The apparatus of claim 8, the logic further comprising logic for:
setting a timeout parameter in response to a determination that the first node has the lowest connectivity within the cluster;
delaying the shutting down of the first node until the lowest connectivity has persisted through a successive heartbeat; and
incrementing the timeout parameter in response to the delaying; and
implementing the shutting down of the first node only in response to a determination that the timeout parameter has exceeded a predefined limit.

12. The apparatus of claim 11, the logic further comprising logic for resetting the timeout parameter in response to a determination after the successive heartbeat that the first node no longer has the lowest connectivity within the cluster.

13. The apparatus of claim 8, the logic further comprising logic for ignoring a topology map of a node with a connectivity of zero.

14. The apparatus of claim 8, wherein the cluster is a composite of two or more other clusters.

15. A computer programming product, comprising:
a non-transitory computer-readable storage medium; and
logic, stored on the computer-readable storage medium for execution on a processor, for:
receiving, at a first node of a plurality of nodes in a cluster, a plurality of heartbeats, each heartbeat corresponding to a particular, corresponding other node in the cluster and comprising:
information on the corresponding other node;
which other nodes are available to the corresponding other node; and
to which other nodes each corresponding node is directly connected in the same cluster;
generating, by the first node, a topological map of the cluster based upon the information comprising the heartbeats; wherein the topology map includes the current status of nodes and connections between nodes;
comparing, by the first node, the topological map of the cluster and topological maps generated by each node;
in response to a determination that the topological maps of the cluster and each node are not in agreement, determining the connectivity of the first node with respect to the cluster; and
in response to a determination that the first node has the lowest connectivity within the cluster, shutting down the first node, wherein the lowest connectivity is based upon which other nodes of the plurality of nodes each corresponding node are directly connected to the corresponding node.

16. The computer programming product of claim 15, the logic further comprising logic for:
detecting that connectivity of the first node and a connectivity corresponding to a second node of the plurality of nodes are equal and the lowest connectivity within the cluster; and
implementing a tie breaker procedure to designate which of the first node and the second node is shutdown.

17. The computer programming product claim 16, the tie breaker procedure comprising logic for:
comparing a node ID of the first node to a node ID of the second node if the first and second nodes are on a common site; and
comparing a site ID of the first node to a site ID of the second node if the first and second nodes are not on a common site.

18. The computer programming product of claim 15, the logic further comprising logic for:
setting a timeout parameter in response to a determination that the first node has the lowest connectivity within the cluster;
delaying the shutting down of the first node until the lowest connectivity has persisted through a successive heartbeat; and
incrementing the timeout parameter in response to the delaying; and
implementing the shutting down of the first node only in response to a determination that the timeout parameter has exceeded a predefined limit.

19. The computer programming product of claim 18, the logic further comprising logic for resetting the timeout parameter in response to a determination after the successive heartbeat that the first node no longer has the lowest connectivity within the cluster.

20. The computer programming product of claim 15, the logic further comprising logic for ignoring a topology map of a node with a connectivity of zero.

* * * * *